United States Patent Office 3,053,633
Patented Sept. 11, 1962

3,053,633
PEROXIDE STABILIZATION
Arthur K. Dunlop and Robert E. Meeker, Berkeley, Calif., assignors to Shell Oil Company, a corporation of Delaware
No Drawing. Filed Dec. 14, 1959, Ser. No. 859,126
9 Claims. (Cl. 23—207.5)

This invention relates to methods for reducing the decomposition losses of peroxy compounds. It deals with the use of a new type of stabilizer which can effectively retard loss of percompounds during storage, transportation and use.

Peroxy compounds have long been known to lose active oxygen readily so that their effectiveness as oxidizing agents and in other uses is impaired and may even become completely lost in a relatively short time. Many different types of additives have been proposed for use in overcoming this difficulty but none have been as effective as would be desirable. Sodium pyrophosphate is an example of an additive which has been widely used for stabilizing hydrogen peroxide solutions in spite of the fact that its tends to undergo conversion to the ineffective orthophosphate especially in dilute peroxide at elevated temperatures and is corrosive to the aluminum containers often employed for hydrogen peroxide storage.

An important object of the present invention is to provide a stabilizer for percompounds which minimizes these disadvantages. Another object is to provide stabilized percompounds which have improved resistance to decomposition both at ordinary and elevated temperatures. A special object is the provision of a new organic stabilizer which can be used to enhance the effectiveness of other stabilizers in solutions of percompounds. Another special object is to provide new stabilized compositions containing hydrogen peroxide or peracids or the like. Still other objects and advantages of the invention will be apparent from the following description of certain of its applications which are intended to be illustrative only since the invention can be successfully carried out in still other ways.

In accordance with the invention peroxy compounds are stabilized by adding thereto a stabilizing amount of phytic acid, i.e., the hexaphosphoric acid ester of hexahydroxycyclohexane, or its soluble salts. It has been found that these stabilizers are especially effective in stabilizing percompounds which present difficult stability problems resulting from contamination of the peroxide with iron.

Only a relatively small amount of phytic acid need be used in the process, amounts of the order of about 1 to about 1000 milligrams per liter of the solution of percompound being stabilized being usually sufficient. However, larger or smaller amounts, advantgeously amounts between about 10 to about 500 milligrams per liter, can be successfully used.

The phytic acid can be incorporated in the peroxy compound in any suitable way. For example, in stabilizing aqueous solutions of peroxy compounds one can conveniently add the commercially available 70% phytic acid solution directly to the solution or a diluted solution of phytic acid in water or peroxide can be added to the solution being stabilized.

There are special advantages in maintaining acidic conditions during stabilization of percompounds with phytic acid and a pH of about 2 to 5 is preferred when stabilizing hydrogen peroxide, for example. The pH's referred to here are the aqueous equivalent pH's of the peroxide solution which correspond to glass electrode readings in hydrogen peroxide solutions corrected as pointed out by J. R. Kolczynski et al. in Journal of the American Chemical Society, vol. 79, page 531 (1957).

The invention is of special importance for the stabilization of hydrogen peroxide solutions as shown in the following examples illustrative of certain of the methods of applying the new stabilizers.

Example I

Hydrogen peroxide of 35% concentration, containing 0.02 milligram of copper and 0.10 milligram of iron per liter as impurities was used for comparative tests of sodium pyrophosphate and phytic acid as stabilizers when employing amounts which gave the same phosphorus concentration in th peroxide. After adding the stabilizers and adjusting the pH to 2.5 direct reading (i.e. uncorrected for peroxide concentration effect), the stabilities of the solutions as measured in the usual way by determining the amount of oxygen evolution during heating at 100° C. The following results wer obtained:

| Inhibitor | Peroxide Decomposition Rate (percent per hour at 100° C.) | Effective Life of Inhibitor at 100° C. |
|---|---|---|
| None | 42.0 | |
| Sodium Pyrophosphate | 1.1 | 2 |
| Phytic acid | 0.9 | [1] 5 |

[1] Inhibitor did not break down during the test period but was still effective when the test was terminated after five hours.

Example II

The effectiveness of different amounts of phytic acid as stabilizers for 35% hydrogen peroxide containing 0.05 milligram per liter of iron as impurity were determined by the method of Example I with the following results:

| Concentration of Phytic Acid (milligrams per liter) | Peroxide Decomposition Rate (percent per hour at 100° C.) | Effective Life of the Phytic acid at 100° C. |
|---|---|---|
| None | 2.7 | |
| 17.5 | 0.04 | 5 |
| 175 | 0.06 | 12 |
| 350 | 0.08 | 13 |

While phytic acid is advantageous when used alone as a stabilizer for percompounds, it also has special advantages when used in combination with other stabilizers of per oxygen compounds as illustrated in the following examples. Other stabilizers which can be thus used include inorganic stabilizers of peroxides such, especially as the soluble stannates, particularly sodium stannate or the like. Organic stabilizers which are chelating agents for heavy metal ions are greatly improved in their effectiveness by use with phytic acid. Ordinarily about 1 to about 500 milligrams per liter of peroxide solution, more preferably about 10 to about 250 milligrams of such other stabilizers are useful with phytic acid.

Amine type stabilizers are especially preferred auxiliary stabilizers for use with phytic acid according to the invention. Examples of such stabilizers are the poly(carboxyalkyl)amines such as ethylenediaminetetraacetic acid, 1,2-diamino-cyclohexane-N,N,N',N'-tetraacetic acid and the like, other carboxylic acid-substituted amines such as picolinic acid, glutamic acid, etc. Other types of stabilizers which are useful include oxine hexamethylenetetraamine, and benzylaminosulfonates. Salt forms of these stabilizers can be used instead of the free acids.

Example III

The improvement obtainable by using phytic acid instead of sodium pyrophosphate in combination with organic chelating agents for heavy metal ions is illustrated by the following results obtained in tests with acridine, 2,2'-biquinolyl and 2,2',2''-terpyridyl as the chelating agents in 35% hydrogen peroxide containing 0.10 milligram of iron per liter as impurity. The peroxide stability tests were carried out with the peroxide at pH 2.5, direct reading, and 100° C. as described in Example I.

| Inhibitor or Inhibitors and amounts in milligrams per liter of peroxide | Peroxide Decomposition Rate (Percent per hr. at 100° C.) | Effective Life of the Inhibitor or inhibitor mixture at 100° C. |
|---|---|---|
| None | 5.0 | |
| 50 mg. Acridine | 3.0 | 2 |
| 50 mg. Acridine+250 mg. Sodium Pyrophosphate | 0.03 | 5 |
| 50 mg. Acridine+175 mg. Phytic acid | 0.02 | 16 |
| 50 mg. 2,2-Biquinolyl | 5.7 | 1 |
| 50 mg. 2,2-Biquinolyl+250 mg. Sodium Pyrophosphate | 0.21 | 2 |
| 50 mg. 2,2-Biquinolyl+175 mg. Phytic acid | 0.24 | 9 |
| 50 mg. 2,2',2''-Terpyridyl | 0.04 | 5 |
| 50 mg. 2,2',2''-Terpyridyl+250 mg. Sodium Pyrophosphate | 0.04 | 4 |
| 50 mg. 2,2',2''-Terpyridyl+175 mg. Phytic acid | 0.06 | [1] 10 |

[1] pH of peroxide was 1.6, direct reading.

*Example IV*

Phytic acid or its soluble salts also give improved results over those obtainable with sodium pyrophosphates when used with 2,6-pyridinedicarboxylic acid as the peroxide stabilizer of the chelating type. In tests carried out by the method of Example I using 35% hydrogen peroxide containing 0.10 milligram of iron per liter as the impurity, the peroxide decomposition rate in percent per hour at 100° C. and the effective life of the inhibitor combination were 0.09% and 6 hours, respectively, with 50 milligrams of 2,6-pyridinedicarboxylic and plus 250 milligrams per liter of sodium pyrophosphate. When using the same amount of 2,6-pyridinedicarboxylic acid together with 175 milligrams per liter of phytic acid, i.e. the amount which provides the same concentration of phosphorus in the peroxide, the decomposition rate and effective life of the inhibitor under the same conditions were, 0.07% per hour and 10 hours, respectively, at 100° C.

*Example V*

The improvement provided by combinations of the new inhibitors with organic hydrogen peroxide stabilizers is also realized with peroxide which contains both copper and iron as impurities as shown by the following results of tests carried out as in Example I with 35% $H_2O_2$ at pH 2.5 direct reading when the impurities were 0.02 and 0.10 milligram of Cu and Fe, respectively, per liter.

| Inhibitor or Inhibitors and amounts in milligrams per liter of peroxide | Peroxide Decomposition Rate (Percent per hr. at 100° C.) | Effective Life of the Inhibitor or inhibitor mixture at 100° C. |
|---|---|---|
| None | 42 | |
| 50 mg. Acridine | 3.0 | 2 |
| 50 mg. Acridine+250 mg. Sodium Pryophosphate | 0.03 | 5 |
| 50 mg. Acridine+175 mg. Phytic acid | 0.02 | 16 |
| 50 mg. 2,2',2''-Terpyridyl | 0.06 | 2 |
| 50 mg. 2,2',2''-Terpyridyl+250 mg. Sodium pyrophosphate | 0.07 | [1] 2 |
| 50 mg. 2,2',2''-Terpyridyl+175 mg. Phytic acid | 0.05 | 7 |

[1] pH of peroxide=1.6 direct reading.

As previously indicated, the invention is not limited to the stabilization of hydrogen peroxide, but can be applied in accordance with the methods of the examples to stabilize other percompounds which tend to lose active oxygen. The new inhibitors are especially useful in stabilizing acidic percompounds as a class including peracids such, for instance, as persulfuric acid, perphosphoric acid, and the percarboxylic acids of which performic, peracetic, perpropionic, perbutyric, perbenzoic, mono- and di-perphthalic and like acids as well as hydrogen peroxide. Salts of these free acids can be stabilized in the same way as the acids themselves, using either phytic acid alone or with other stabilizers of either organic or inorganic type. Typical of the other percompounds which can be stabilized, are, for example, sodium perborate, potassium percarbonate, sodium peroxide and the like. Also, as previously indicated, instead of phytic acid one can add its soluble salts, especially the alkali metal and/or soluble alkaline earth metal salts, and achieve good stabilization. This is intended to be included with the scope of the appended claims where reference is made only to the acid itself.

It will thus be apparent that the invention can take different forms since a wide variety of unstable percompounds can be stabilized with phytic acid and/or its soluble salts and that the invention is not limited to the examples which have been given by way of illustration nor to any theory used to explain the improved results which are obtained.

We claim as our invention:

1. A method of stabilizing peroxy compounds which undergo loss of active oxygen during storage at ordinary temperatures, which comprises adding to the peroxy compound about 1 to about 1000 parts by weight of phytic acid per million parts of the stabilized composition.

2. A method of stabilizing solutions of acidic peroxy compounds which comprises adding thereto about 1 to about 1000 milligrams of phytic acid per liter.

3. A method of stabilizing aqueous hydrogen peroxide which comprises adjusting the aqueous equivalent pH to within the range of about 2 to 5 and adding about 10 to about 500 milligrams of phytic acid per liter.

4. Hydrogen peroxide containing as stabilizer about 1 to about 1000 milligrams of phytic acid per liter.

5. Hydrogen peroxide stabilized as in claim 4 containing about 1 to about 500 milligrams of an organic chelating agent for heavy metal ions per liter.

6. Hydrogen peroxide having an aqueous equivalent pH of about 2 to 5 and containing about 10 to about 500 milligrams of phytic acid and about 1 to about 500 milligrams of pyridinedicarboxylic acid per liter.

7. Aqueous peroxy acid solution containing as stabilizer about 1 to about 1000 milligrams of phytic acid per liter.

8. Percarboxylic acid solution containing as stabilizer about 1 to about 1000 milligrams of phytic acid per liter.

9. Peracetic acid solution containing about 10 to about 500 milligrams of phytic acid per liter.

References Cited in the file of this patent

UNITED STATES PATENTS 2,624,655 Greenspan _____ Jan. 6, 1953
2,626,238 Artz _____ Jan. 20, 1953